E. R. JONES.

Sweat Pad for Horse Collars.

No. 9,519. Reissued Dec. 28, 1880.

WITNESSES

Villette Anderson.

Philip A. Masi.

INVENTOR

Edward Richards Jones, by E. W. Anderson, his ATTORNEY

N. PETERS, PHOTO-LITHOGRAPHER, WASHINGTON, D. C.

UNITED STATES PATENT OFFICE.

EDWARD R. JONES, OF CHEMUNG, NEW YORK.

SWEAT-PAD FOR HORSE-COLLARS.

SPECIFICATION forming part of Reissued Letters Patent No. 9,519, dated December 28, 1880.

Original No. 231,326, dated August 17, 1880. Application for reissue filed September 11, 1880.

*To all whom it may concern:*

Be it known that I, EDWARD R. JONES, of Chemung, in the county of Chemung and State of New York, have invented certain new and useful Improvements in Sweat-Pads for Harness, &c.; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
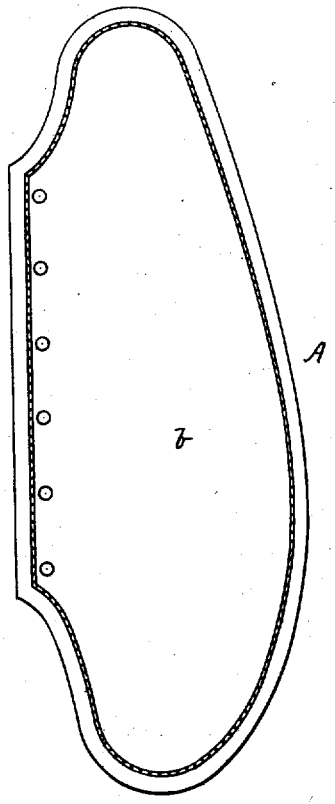
Figure 2:
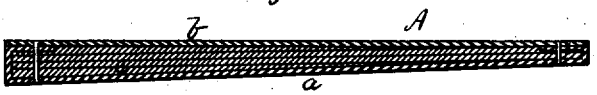

Figure 1 is a representation of a side view of a collar-pad embodying this invention. Fig. 2 is a sectional view of the same.

This invention has relation to harness-bearings designed to prevent the occurrence of galls, and to cure the same when already existing; and it consists in the construction and novel arrangement of a sweat-pad, composed of one or more layers of felting or paper, an exterior covering of water-proof leather or oil-cloth, and an interior covering of canvas or oil-cloth coated with a compound of lead-paint, oil, and carbolic acid, forming a soft, flexible, and remedial bearing, as hereinafter shown and described.

In the annexed drawings, the letter A designates a sweat-pad for a horse-collar, said pad being composed of one or more layers or thicknesses of card-board, paper, or felt, inclosed between a canvas or other woven envelope, *a*, and a preferably glazed envelope, *b*, the whole being pressed into shape to fit the shoulders, and stitched together, as indicated in Fig. 1 of the drawings, the envelope *a* being designed to bear against the neck and shoulders of the animal, and the outer envelope, *b*, to prevent rain from penetrating to and soaking the layer or layers of felt *c*. The face *a* of the pad is given one or more coats of lead-pigment, dissolved in oil, and a proportion of carbolic acid, the effect of which is by its cooling properties to prevent undue sweating and the consequent galling of the parts, and by its remedial qualities to heal and cure sores already formed.

Sometimes it may be advisable to apply the healing compound to the bearing-surfaces of an ordinary collar; but the pad is preferable, because of its superior flexibility.

What I claim, and desire to secure by Letters Patent, is—

As an improved article of manufacture, a sweat-pad composed of one or more layers of felting, an exterior covering of water-proof leather or oil-cloth, and an interior covering of canvas or oil-cloth coated with a compound of lead-paint, oil, and carbolic acid, forming a soft, flexible, and remedial bearing, substantially as specified.

In testimony that I claim the foregoing I have hereunto set my hand this 3d day of September, 1880.

EDWARD RICHARDS JONES.

Witnesses:

CHARLES F. KINNEY,
SAMUEL B. GREENE.